United States Patent [19]

Gorfien et al.

[11] 4,148,929

[45] Apr. 10, 1979

[54] STABILIZED FROZEN POTATO SALAD

[75] Inventors: Harold Gorfien, Framingham; Abdul R. Rahman, Natick; Donald E. Westcott, Acton, all of Mass.

[73] Assignee: The United States of America as represented by the Secretary of the Army, Washington, D.C.

[21] Appl. No.: 864,892

[22] Filed: Dec. 27, 1977

[51] Int. Cl.² ............................................. A23L 1/216
[52] U.S. Cl. .................................. 426/576; 426/605; 426/613; 426/637
[58] Field of Search ............... 426/637, 576, 650, 605, 426/613

[56] References Cited

U.S. PATENT DOCUMENTS

| | | | |
|---|---|---|---|
| 2,206,483 | 7/1940 | Meaker | 426/637 |
| 3,264,121 | 8/1966 | Tuomy | 426/640 |

*Primary Examiner*—Jeanette M. Hunter
*Attorney, Agent, or Firm*—Nathan Edelberg; Robert P. Gibson; Charles C. Rainey

[57] ABSTRACT

A freeze and thaw stabilized potato salad product and method of producing the same wherein the salad dressing incorporated in the potato salad has a hydrocolloid, e.g. gelatin, added thereto to effect stabilization and prevention of the separation of oil from the salad dressing upon thawing of the frozen potato salad containing such modified salad dressing.

5 Claims, No Drawings

STABILIZED FROZEN POTATO SALAD

The invention described herein may be manufactured, used, and licensed by or for the Government for governmental purposes without the payment to us of any royalty thereon.

BACKGROUND OF THE INVENTION

This invention relates to a method for producing freeze and thaw stabilized potato salad comprising an oil emulsion type food dressing from which oil does not separate following freezing and thawing of said potato salad.

It has not been practicable heretofore to freeze and store potato salad made with an oil emulsion type food dressing until time for consumption of the potato salad arrives because mayonnaise and other types of oil emulsion type salad dressings containing appreciable amounts of oil are notoriously susceptible to breaking of their emulsions upon freezing with the resultant separation of oil in the potato salad, producing an undesirable appearance and a concentrated oily effect on the senses of taste and mouth feel which have such an important effect on the acceptability of potato salad. Traditionally potato salad has required refrigeration to prevent microbiological spoilage, but its shelf life is quite limited under such conditions because of gradual development of microbial contamination and oxidative deterioration even under refrigeration conditions.

The Armed Forces especially would like to be able to prepare potato salad in quantity a long time ahead of consumption so that it could be shipped long distances and fed to the troops whenever and wherever desired without its having to be freshly prepared shortly before being consumed in order to minimize the chances of sickness from potato salad being permitted to develop a high bacterial contamination. The present invention makes this possible not only for the Armed Forces, but for the civilian market as well.

It is an object of the invention to provide a process for producing frozen potato salad comprising an oil emulsion type food dressing which upon being thawed reverts to substantially the condition in which it existed prior to being frozen and, therefore, without any separation of oil in the potato salad from breakdown of the dressing.

It is also an object of the invention to stabilize frozen potato salad comprising an oil emulsion type food dressing against breakdown of the dressing therein and resultant separation of oil in the potato salad upon thawing thereof.

Other objects and advantages of our invention will become apparent in the course of the following description of the practice of the invention.

It is to be understood that the term "oil emulsion type food dressing" includes any known commercial mayonnaise product, as well as other food dressings of the emulsion type having an oil content of from about 35% to about 80% or even higher in some cases. Such food dressings are described in Federal Specification EE-M-131F, dated June 27, 1975, entitled "Mayonnaise And Salad Dressing", which is incorporated herein by reference.

It is also to be understood that potato salad is a mixture of cubed or sliced or otherwise subdivided potatoes which have been cooked under moist conditions by boiling in water or steaming, the cooked, subdivided potato pieces being tossed in or with a food dressing, as defined above, and sometimes having added to the resulting mixture of cooked potato pieces and food dressing various modifying ingredients, primarily for flavor purposes, such as chives, chopped celery, chopped onions, subdivided pimentos, subdivided green peppers, subdivided hard cooked eggs, relishes and various types of seasonings and condiments.

All percentages stated in the specification and claims are to be understood as percentages by weight unless otherwise indicated.

SUMMARY OF THE INVENTION

The stabilization of potato salad in accordance with the invention is accomplished by introducing a small quantity of a hydrocolloid, such as gelatin, into the food dressing prior to mixing of the food dressing with the potatoes and other ingredients used in making the potato salad, and prior to freezing of the potato salad.

DESCRIPTION OF THE PREFERRED EMBODIMENT

The following example illustrates the process of the invention.

EXAMPLE 369 g of sliced, white, dehydrated potatoes were added to a boiling solution containing 1362 g of water and 13 g of salt in a pan and stirred, then covered and cooked in an oven at 400° F. for 30 minutes, the mixture being stirred lightly occasionally. The mixture was chilled to 40°–45° F. after the 30 minute cooking period.

32.5 g of minced, dehydrated onions were added to 198.5 g of water at a temperature of 60°–70° F. and stirred, then allowed to stand for 20 minutes.

64 g of drained, sweet pickle relish, 231 g of the above-described rehydrated, minced onions, 200 g of fresh celery in 0.25 inch dice, 54 g of drained, canned pimentos chopped into 0.25 inch long pieces (maximum dimension), 54 g of frozen, green peppers chopped into 0.25 inch long pieces (maximum dimension), 30 g of hard cooked eggs chopped into 0.25 inch long pieces (maximum dimension), 14 g of salt, and 1 g of black pepper powder were thoroughly mixed together and mixed with the above-described rehydrated, baked potatoes weighing about 1744 g.

4.5 g of plain, unflavored gelatin were added to 47 g of boiling water and the solution stirred until all of the gelatin was dissolved. The aqueous gelatin solution was cooled to from about 120° F. to about 126° F. and 4 g of synthetic dry vinegar prepared in accordance with Military Specification MIL-V-35017D, entitled "Vinegar, Dry, Synethetic", dated Apr. 15, 1975, were added to the aqueous gelatin solution and thoroughly mixed therewith to dissolve the synthetic vinegar in the aqueous solution of gelatin at a temperature of 120°–126° F.

The aqueous solution of gelatin and vinegar was whipped into 369 g of salad dressing prepared in accordance with the above-mentioned Federal Specification EE-M-131F, described therein as Type II, Class 2, and containing soybean oil, egg yolk, starch, food starch-modified, flour, sugar, mustard, and various spices and flavors or seasonings. The resulting 424.5 g of modified salad dressing containing gelatin was folded into the mixture of approximately 1744 g of rehydrated potatoes and 648 g of the mixture of rehydrated onions, pickle relish, celery, pimentos, green peppers, hard cooked eggs, salt, and pepper. The resulting approximately 2816.5 g of potato salad was placed in a pan, covered, and frozen at a temperature below zero degrees F.

About 24 to 28 hours before it was desired to serve potato salad with a meal, the pan of frozen potato salad, prepared as described above, was removed from the freezer and placed in a chill box maintained at 40°–45° F. and held there until the temperature of the potato salad reached 35°–45° F., this requiring about 24–28 hours. The thawed potato salad was served to a technological panel, who rated the potato salad in accordance with a numerical scale from 1 to 9 with respect to color, odor, flavor, texture, and overall appearance. In the rating scale a rating of 1 indicates "dislike extremely"; a rating of 9 indicates "like extremely"; while a rating of 5 indicates borderline acceptability or "neither like nor dislike". A rating of 6 indicates "like slightly", while a rating of 7 indicates "like moderately" and a rating of 8 indicates "like very much". The technological panel, consisting of 13 trained food technologists, assigned average ratings to the thawed potato salad of:

| | | |
|---|---|---|
| | Color | 7.23 |
| | Odor | 7.00 |
| | Flavor | 6.62 |
| | Texture | 6.00 |
| | Appearance | 7.15 |

None of the panel members reported seeing any separated oil. It is apparent, therefore, that the modification of the salad dressing with gelatin stabilized the salad dressing so as to prevent the separation of oil therefrom as a result of the freezing and subsequent thawing of the potato salad. Similarly prepared potato salad made with salad dressing to which gelatin had not been added separated large amounts of oil when thawed after having been frozen with the salad dressing mixed with the other potato salad ingredients.

The solution of gelatin in boiling water was cooled to 120°–126° F. before addition of the synthetic dry vinegar to prevent hydrolysis of the gelatin by the acid. Synthetic dry vinegar was used as the source of acid for the salad dressing to avoid excessive dilution which would have occurred if liquid vinegar had been used to introduce the amount of acid desired in a salad dressing of the type usually employed in making potato salad.

Although the invention has been described in terms of the freeze-thaw stabilization of potato salad, it is to be understood that any salad which is made with a salad dressing of the emulsion type containing from about 35% to about 80% oil in the salad dressing and which contains vegetables and/or fruits whose structures are not adversely affected by freezing and thawing may be similarly stabilized by incorporating a hydrocolloid, such as gelatin, in the salad dressing used.

We wish it to be understood that we do not desire to be limited to the exact details described, for obvious modifications will occur to a person skilled in the art.

We claim:

1. Process for producing frozen potato salad comprising subdivided, cooked potatoes, an oil emulsion type food dressing selected from the group consisting of mayonnaise and salad dressing, and modifying ingredients, said frozen potato salad being stabilized against the separation of oil therein, which comprises the steps of adding to said food dressing and thorough mixing therewith an aqueous solution of gelatin and synthetic dry vinegar prior to mixing of said food dressing with said subdivided, cooked potatoes and said modifying ingredients, mixing said food dressing containing said aqueous solution of gelatin and synthetic dry vinegar with said subdivided, cooked potatoes and said modifiying ingredients to form a stabilized potato salad, and freezing said stabilized potato salad to produce said frozen potato salad.

2. Process according to claim 1, wherein said aqueous solution of gelatin and synthetic dry vinegar contains from about 7 to about 10 percent gelatin by weight and from about 6 to about 9 percent synthetic dry vinegar by weight.

3. Process according to claim 1, wherein the temperature of said aqueous solution of gelatin and synthetic dry vinegar is from about 120° F. to about 126° F. when said food dressing is being mixed therewith.

4. Process according to claim 1, wherein said aqueous solution is prepared by dissolving said gelatin in boiling water to form an aqueous solution of gelatin, cooling said aqueous solution of gelatin to a temperature of from about 120° F. to about 126° F., and then dissolving said synthetic dry vinegar in said aqueous solution of gelatin.

5. A stabilized frozen potato salad which upon being thawed does not separate oil therein, produced in accordance with the process of claim 2.

* * * * *